United States Patent [19]

Fleischmann et al.

[11] Patent Number: 5,059,270

[45] Date of Patent: Oct. 22, 1991

[54] PROCESS FOR THE WELDING OF PLASTIC FILMS LYING FLAT ONE ON TOP OF THE OTHER

[75] Inventors: Edgar Fleischmann, Munich; Maximillian Mayr, Garching/Alz; Heinrich Heitz, Germering, all of Fed. Rep. of Germany

[73] Assignee: Alkor GmbH Kunststoffe, Munich, Fed. Rep. of Germany

[21] Appl. No.: 324,552

[22] Filed: Mar. 16, 1989

[30] Foreign Application Priority Data

Mar. 23, 1988 [DE] Fed. Rep. of Germany ....... 3809698

[51] Int. Cl.$^5$ ............................................. B32B 31/20
[52] U.S. Cl. .................................... 156/251; 156/515; 156/530; 156/583.1
[58] Field of Search ............. 156/515, 251, 530, 583.1

[56] References Cited

U.S. PATENT DOCUMENTS

| | | | |
|---|---|---|---|
| 3,957,569 | 5/1976 | Freitag | 156/515 |
| 4,268,338 | 5/1981 | Peterson | 156/515 |
| 4,545,844 | 10/1985 | Buchanan | 156/530 |
| 4,692,135 | 9/1987 | Johnson | 156/515 |

Primary Examiner—Caleb Weston
Attorney, Agent, or Firm—Foley & Lardner

[57] ABSTRACT

In a process for the welding of plastic films lying flat, one on top of the other, the plastic films are brought into contact with a heated cutting edge and hot-tool welded. Two-layered or multilayered composite films of different chemical composition are used for the welding; for example, one composite film can be an opaque, colored or uncolored layer, on which there is arranged a transparent sealing layer comprised of a propylene-ethylene copolymer or a propylene-ethylene blend. The sealing layer of the opaque composite film is welded directly to a sealing layer of a second, transparent composite film.

11 Claims, 1 Drawing Sheet

PROCESS FOR THE WELDING OF PLASTIC FILMS LYING FLAT ONE ON TOP OF THE OTHER

BACKGROUND OF THE INVENTION

The present invention relates to a process for welding plastic films that are positioned lying flat, one on top of the other. The invention further relates to plastic articles produced by the process and to an apparatus for use in performing the process.

It is known that plastic films, such as sheets and cut-to-size pieces, can be brought into flat-surface contact and then welded. But problems arise in the welding of certain plastic films, for example, films comprising polyolefins (polypropylene, polyethylene and the like) as well as other plastics, due to defects which occur during or after the welding operation. Examples of such defects include undulations of the material next to the weld seams, warping effects, shrinkage effects, flaws and the like.

Processes are known in which the polymer films are subjected to a pretreatment, for example, a conditioning before the welding operation (see German patent specification No. 2,630,817). Furthermore, devices are known for the heat-sealing of thin thermoplastic layers, particularly film tubes, in which a heater band or welding band provided with a separating bar is moved against a flexible, compressible support, and welding is carried out under pressure.

These processes and apparatus are disadvantageous due to difficulties which occur, with the welding or with the material being welded, in the case of film sheets comprising certain types of plastic. In particular, unreliable weld seams occur, and only straight welding is possible; no L-shaped, arcuate, H-shaped or similar separating seams can be achieved. Furthermore, it is known that the separating seams can be easily torn open and damaged after the hot-tool welding.

SUMMARY OF THE INVENTION

Accordingly, it is an object of the present invention to provide a process, an apparatus for effecting that process, and products obtained thereby which avoid the disadvantages described.

Another object of the present invention is to provide reliable separating seams which can be subjected to mechanical loading.

A further object of the present invention is to provide improved plastic bags, folders, envelopes and like products which are easy to produce.

Yet another object of the present invention is to provide a process and apparatus capable of forming nonlinear weld seams, in particular L-shaped, arcuate, U-shaped and multi-cornered separating seams.

Still a further object of the present invention is to provide an apparatus that is easy to operate and regulate with respect to the welding shape to be used.

In accomplishing the foregoing objects, there has been provided, in accordance with one aspect of the present invention, a process for welding composite plastic films, comprising the steps of (A) providing (i) a first composite plastic film that comprises an opaque layer comprising about 50-80 parts by weight of polypropylene, about 5-15 parts by weight of a constituent which comprises EPDM or EPM, about 0.5-10 parts by weight of filler, about 1-15 parts by weight of ethylene-vinyl acetate copolymer, about 10-30 parts by weight of polyethylene or ethylene copolymer, about 0-3.5 parts by weight of a processing aid or additive, and about 0-8 parts by weight of at least one dye or pigment, and a transparent sealing layer comprising a propyleneethylene copolymer or blend, and (ii) a second composite plastic film that comprises a transparent layer comprising polypropylene and a transparent sealing layer comprising a propylene-ethylene copolymer or blend, wherein each of the first and second composite plastic films has a Shore D hardness of about 25-68; (B) placing the first composite plastic film in contact with the second composite plastic film, such that the sealing layer of the first composite plastic film directly contacts the sealing layer of the second composite plastic film, forming an interface between the sealing layers; (C) bringing the first and second composite plastic films into contact, respectively, with a heated tool that comprises a contact surface, contact line or cutting edge; and (D) hot-tool welding the first and second plastic films at the interface.

In accordance with another aspect of the present invention there is provided a hot-tool welded plastic article comprising at least two composite plastic films joined by means of a weld seam, wherein the first and second composite plastic films are as described above.

In accordance with still another aspect of the present invention, there has been provided an apparatus equipped with a heated contact surface for the welding of plastic films, comprising a welding press which comprises at least one plastics-welding electrode and at least one counterpressure device, wherein at least one of the welding electrode and the counterpressure device is movable, and wherein the welding electrode presents a cutting edge that has a welding profile which defines an acute angle and that has a parabolic cross section, the lower section of which comprises a circular arc that has a radius of about 0.05-0.12 mm.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

DETAILED DESCRIPTION OF THE PREFERRED EMBODIMENTS

Figure 1:
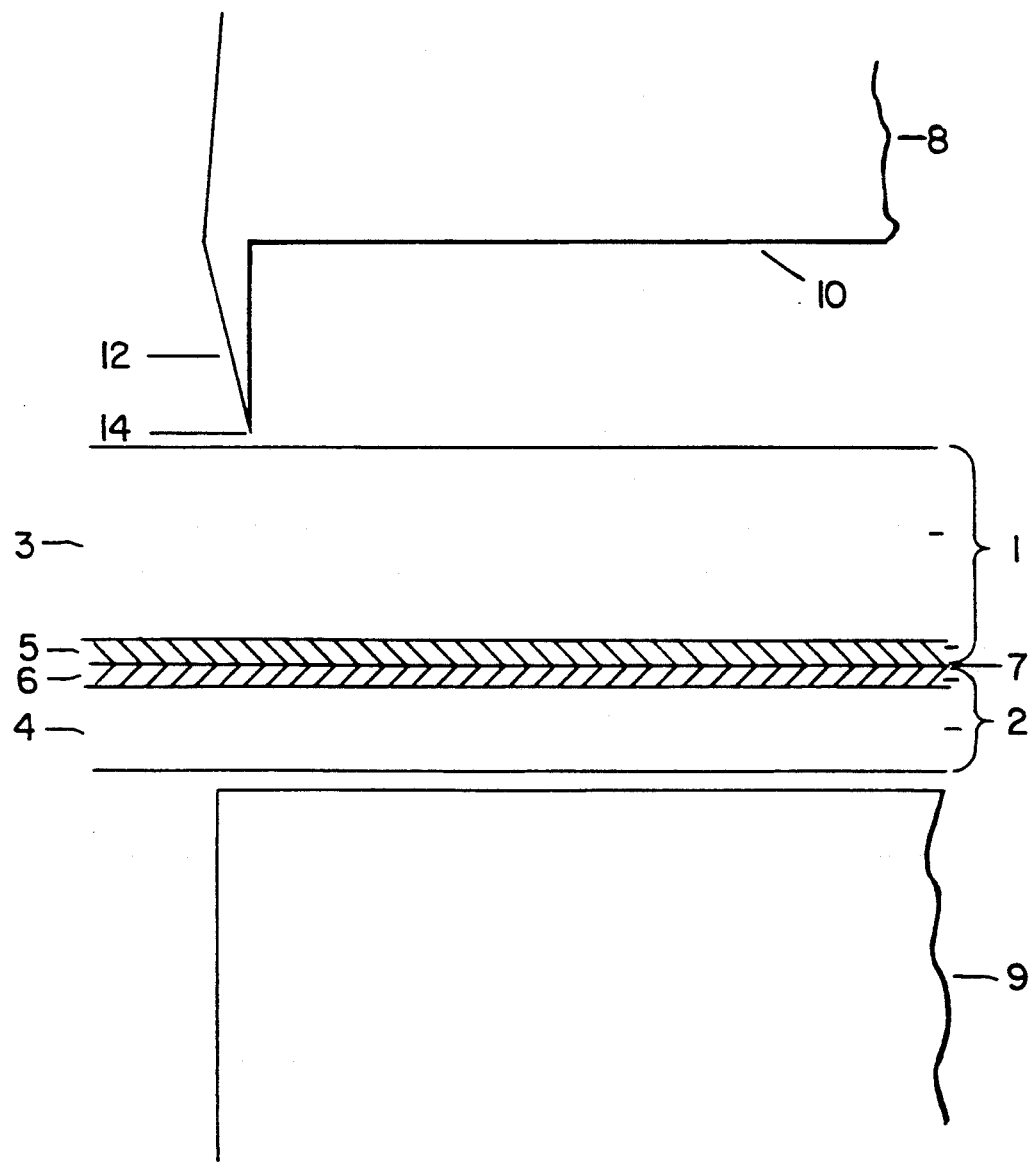
FIG. 1 is a line-drawing that schematically illustrates, in cross section, a preferred orientation of an apparatus within the present invention, relative to composite plastic films to be hot-tool-welded according to the present invention.

With reference to FIG. 1, between the top tool 8 and the bottom tool 9 there is shown a section through a preferred embodiment of a plastic article to be hot-tool welded. The upper composite plastic film 1 of the plastic article comprises an opaque layer 3, adjacent to which is a sealing layer 5. The lower composite plastic film 2 comprises a transparent layer 4, adjacent to which is a sealing layer 6. The arrangement of films 1 and 2 in FIG. 1, where opaque layer 3 of film 1 is uppermost, is preferred but can be reversed, i.e., so that transparent layer 4 is uppermost. In either case, the composite plastic films 1,2 are arranged such that their respective sealing layers 5,6 are in contact, forming interface 7, at which interface welding of the composite plastic films occurs.

Top tool 8 comprises a cutting edge 12 having a tip 14 comprising a circular arc. Top tool 8 further comprises a welding surface 10 located behind cutting edge 12.

The composite plastic films welded in the process according to the invention preferably comprise more than 50% by weight of olefin homopolyers, olefin copolymers, olefin terpolymers or polyolefin blends.

According to a preferred embodiment of the process according to the invention, the opaque layer comprises 55–70 parts by weight of polypropylene, 5.5–10 parts by weight of EPDM, 1–5 parts by weight of filler, 3–10 parts by weight of ethylene-vinyl acetate copolymer, 15–25 parts by weight of polyethylene and 0.1–1.5 parts by weight of a processing aid as well as 0.1–5 parts by weight of at least one dye or pigment.

According to another preferred embodiment, the transparent layer comprising polypropylene further comprises 0–2.5 parts by weight, particularly preferably 0.1–1.5 parts by weight, of a processing aid per 100 parts by weight of propylene homopolymer.

The sealing layer preferably comprises 1–15 parts by weight, particularly preferably 3–10 parts by weight, of polyethylene or ethylene units per 100 parts by weight of propylene-ethylene copolymer.

Preferably, the composite plastic films have a Shore D hardness of 33–63.

Performance of welding in accordance with the present invention, using composite films as described above, yields the following advantages, among others: high weld seam strength, simple processing during welding, production of visually attractive articles.

The opaque composite film is preferably a two-layered composite film including an opaque layer with a thickness of about 50–400 μm, in particular 100–300 μm, and a sealing layer with a thickness of about 20–60 μm, particularly preferably 25–50 μm.

The transparent composite film is preferably a two-layered composite film made up of a transparent layer of about 50–250 μm thickness, preferably 80–160 μm, and a sealing layer with a thickness of about 20–60 μm, in particular 25–50 μm.

In the process according to the present invention, the welding temperature is set as a function of film thickness, welding time, pressure and film composition, in the temperature range of about 100°–190° C., preferably 140°–170° C. (calculated as average welding temperature). Other optional components of the apparatus, in particular temperature separating bands, conveyor belts, working platens and feed apparatus, may also be taken into consideration in setting the welding temperature.

Within the scope of the process according to the present invention, the average range of the welding temperature is about 100°–150° C., preferably 120°–145° C., in the case of the top tool, about 140°–190° C., preferably 150°–175° C., in the case of the bottom tool.

The present invention further relates to hot-tool welded articles, such as plastic bags, folders and envelopes, comprising at least two plastic films which may be cut-to-size pieces arranged on sheets and which are hot-tool welded to each other at or in the vicinity of their borders. The plastic films comprise olefin homopolymers, olefin copolymers, olefin terpolymers or polyolefin blends, which preferably contain polyolefin by more than 50% by weight and have a Shore D hardness of 25–68, preferably 33–63.

According to the present invention, the two-layered or multi-layered articles have layers of different chemical compositions. One composite plastic film comprises an opaque layer, which comprises about 50–80 parts by weight of polypropylene, about 5–15 parts by weight of a constituent which comprises EPDM or EPM, about 0.5–10 parts by weight of filler or filler mixture, about 1–15 parts by weight of ethylene-vinyl acetate copolymer, about 10–30 parts by weight of polyethylene or ethylene copolymer, about 0–3.5 parts by weight, preferably 0.1–1.5 parts by weight of a processing aid or additive, and about 0–8 parts by weight of at least one dye or pigment. On the opaque film there is arranged directly, or via an intermediate layer, a transparent sealing layer comprising a propylene-ethylene copolymer or a propylene-ethylene blend. A second, transparent composite plastic film is joined to the first, opaque composite plastic film, such that the sealing layers of the opaque and transparent composite plastic films are in contact, forming an interface. The sealing layer of the transparent composite film comprises a propylene-ethylene copolymer or a propylene-ethylene blend and is joined directly, or with a transparent intermediate layer or intermediate film interposed, to a transparent layer comprising polypropylene.

In the case of a plastic article, such as a bag, a folder or envelope, hot-tool welded according to the present invention, the opaque layer preferably comprises 55–70 parts by weight of polypropylene, 5.5–10 parts by weight of EPDM, 1–5 parts by weight of filler, 3–10 parts by weight of ethylene-vinyl acetate copolymer, 15–25 parts by weight of polyethylene and 0.1–1.5 parts by weight of a processing aid.

The transparent, polypropylene-based layer of the other composite plastic film preferably comprises 0–2.5 parts by weight, particularly preferably 0.1–1.5 parts by weight, of a processing aid per 100 parts by weight of propylene homopolymer.

The sealing layers of the hot-tool welded plastic bags, folders or envelopes comprise 1–15 parts by weight preferably 3–10 parts by weight of polyethylene or ethylene units per 100 parts by weight of propylene-ethylene copolymer.

The opaque composite plastic film is preferably two-layered and consists of an opaque layer or a film sheet section which is about 50–400 μm, preferably 100–300 μm, in thickness, and a sealing layer with a thickness of about 20–60 μm, particularly 25–50 μm.

The transparent composite plastic film is preferably two-layered and consists of a sealing layer about 20–60 μm thick, particularly preferably 25–50 μm, and a transparent surface layer about 50–250 μm thick, preferably 80–160 μm.

The present invention also relates to an apparatus equipped with a heated contact surface for the welding of plastic films (including cut-to-size pieces arranged on sheets) comprising a welding press which includes at least one plastics welding electrode and at least one counterpressure device, wherein at least one of these is movable, and wherein the welding electrode presents a cutting edge that has a welding profile which defines an acute angle and that has a parabolic cross section, the lower section of which comprises a circular arc that has a radius of about 0.05–0.12 mm.

Preferably, the counterpressure device is a counterpressure platen, bar or rail, particularly a counterpressure electrode. The welding electrode or the counterpressure device may be either directly or indirectly movable.

The welding electrode preferably has a pointed or knife-like cutting edge. If the counterpressure device is a counterpressure electrode, preferably it has a pointed or knife-like cutting edge as well.

According to a preferred embodiment of the present invention, the shape of the welding electrode of the welding press is selected in dependence on the total thickness of the plastic films, such that the vertical distance ($\Delta h$) of the welding profile of the welding electrode from the cutting edge is 75–35%, preferably 65–40%. of the total thickness of the plastic films to be welded. Furthermore, an additional heating takes place from the surface opposite the welding electrode or by the heated counterplaten or counterelectrode.

According to a preferred embodiment of the apparatus, at least one groove or channel (evident when the mold is closed) is arranged in the perpendicular direction with respect to at least one of the cutting edge and the welding press. In this embodiment, the wearing of the cutting edge can be reduced, among other advantages.

The grooves or channels or depressions arranged in the counterelectrode or in the countermold have a depth of 0.1–30 $\mu$m, measured as a vertical distance from the surface of the counterelectrode or countermold to the bottom of the groove or channel.

As described in greater detail below, the welding profile can be set back from the cutting edge of the welding electrode. When there is at least one groove or channel in the counterelectrode or countermold, the groove or channel is arranged perpendicularly (determined with a closed mold) relative to the set-back welding profile.

According to another preferred embodiment, the cutting edge is adapted, when viewed from above, to the shape and dimensions of the article or cut-to-size piece to be hot-tool welded, and has at one or more points an extension directed toward the border of the article or cut-to-size piece.

The welding profile of the welding electrode, and of the counterpressure electrode if present, is preferably set back from the cutting edge and provided with at least one stage or recess. Preferably the welding electrode is arranged approximately vertically with respect to the counterpressure device, to the plastic films, or to both.

Preferably, the counterpressure device on the one hand has profilings, which preferably comprise grooves, channels or projecting edges or elevations, and the welding electrode on the other hand has the cutting edge or the welding profile.

According to a preferred embodiment of the present invention, the cutting edge, preferably pointed or knife-like, has a parabolic cross section, in particular a symmetrical parabolic cross section, which comprises a circular arc in the lower section thereof. The circular arc preferably passes through the vertex of the parabolic cross section, and has an average radius of about 0.05–0.12 mm, particularly 0.06–0.10 mm.

Preferably, the center point of the circle which defines the circular arc lies on the axis of the parabola that most closely approximates the parabolic cross section.

According to a further embodiment, the cross-sectionally circular arc of the cross-sectionally parabolic shape of the cutting edge has a cross-sectionally triangular cutting projection, the tip of which lies at a vertical distance from the circular arc which is less than 0.06 mm, preferably less than 0.05 mm.

According to a preferred embodiment of the present invention, between the top and bottom tools of the welding press there is arranged a band or conveyor belt comprising a material which has low thermal conductivity or is thermally nonconductive. A stationary separating band, separating grid, separating woven fabric or separating knitted fabric is particularly preferably employed.

According to a preferred embodiment of the present invention, the stationary or restrained separating band, separating grid, separating woven fabric or separating knitted fabric is arranged in an unwindable manner on a roller, so that, when the separating band is worn, the place acted upon or worn can be unwound or moved on, the separating band not serving as a conveyor belt or even able to be moved in the opposite direction. This provides an improved utilization or wearing of the separating band, separating grid, separating woven fabric or mixture. An unwinding apparatus for the worn separating band, separating grid, separating woven fabric or separating knitted fabric is preferably arranged on the apparatus.

Rollers, cylinders or similar devices or the winding or unwinding apparatus are in this case arranged as tensioning or retaining apparatus for the stationary separating band, separating grid, separating woven fabric or separating knitted fabric tensioned between electrode and counterelectrode.

In another preferred embodiment, conveyance takes place, with or without a band or conveyor belt, by means of a gripper feed.

According to still another preferred embodiment, a plastic film or sheet is fed to the heat-contact welding press from a roll or a stack. Ahead of the heat-contact welding press, the plastic film cut-to-size pieces to be welded are preferably loosely fixed or provisionally attached on or at the plastic film or sheet.

During heat-contact hot-tool welding, the plastic films, sheets or cut-to-size pieces lying flat, one on top of the other, are pressed together and against each other, or held firm by the welding profile and the resiliently arranged platen, so that a slipping of the plastic material at the time of heat-contact hot-tool welding is prevented.

According to a preferred embodiment, the closing movement or stroke movement of the welding press, preferably of the welding electrode arranged on the platen, takes place by computer control or electronic control. The cutting edge is in this case guided vertically or virtually vertically with respect to the plastic films during the hot-tool welding.

According to a preferred embodiment, the welding press comprises a heated lifting platen (upper heating) and a counterelectrode or heated table top (lower heating) for accommodating the upper and lower tools. Due to a computer-controlled linear amplifier, the welding press is capable of operating accurately to hundredths of a millimeter. Due to this high degree of precision, the depth of penetration of the upper tool can be set exactly and a damaging of the conveyor belt avoided.

Due to the computer or electronic control and the selection of the cutting edge and welding profile of the welding electrode, points or lines of thinned material (predetermined breaking points) are obtained with a uniform material thickness, the standard deviation or tolerance of which, measured over the entire area of the hot-tool welding, at the predetermined breaking point is less than 25%, preferably less than 10%.

After the heat-contact hot-tool welding and advancement or further conveyance, the welded plastic films, sheets or cut-to-size pieces are subjected to a contact cooling or press cooling.

According to a preferred embodiment, the plastic films or sheets with the hot-tool or heat-contact welded articles or cut-to-size pieces, which are in connection with the scrap grid via the predetermined breaking points, are cut or separated by a knife or a similar separating apparatus into individual sheet sections of a length of 100–1000 mm, preferably 200–700 mm, and a width of 200–2000 mm, preferably 500–1200 mm, and only thereafter are the welded plastic articles separated from the scrap grid.

The apparatus according to the present invention also allows the hot-tool welding of polyolefin films, inter alia, as well as the maintaining of high numbers of cycles or relatively high machine speeds and thus an increased production output.

EXAMPLES

| 1. Illustrative formulation for the opaque colored or uncolored layer or film: | |
|---|---|
| 69 | parts by weight of polypropylene |
| 8 | parts by weight of ethylene-propylene-diene terpolymer (EPDM) |
| 1 | part by weight of ethylene-propylene copolymer (EPM) |
| 9 | parts by weight of filler mixture (consisting of calcium carbonate and talc) |
| 3 | parts by weight of a dye and/or pigment mixture. |
| 2. Another formulation for opaque film layer: | |
| 66 | parts by weight of polypropylene |
| 9 | parts by weight of ethylene-propylene-diene terpolymer (EPDM) |
| 8 | parts by weight of ethylene-vinyl acetate copolymer |
| 4.5 | parts by weight of filler mixture (consisting of calcium carbonate) |
| 3.5 | parts by weight of a dye and/or pigment mixture. |
| 3. A sealing-layer composition: | |
| 100 | parts by weight of propylene-ethylene copolymer, of |
| 6 | parts by weight are polyethylene or ethylene units. |
| 4. Another sealing-layer composition: | |
| 100 | parts by weight of propylene-ethylene copolymer with |
| 8 | parts by weight of polyethylene units or ethylene units. |
| 5. Exemplary composition for the transparent layer: | |
| 10 | parts by weight of propylene homopolymer with a proportion of |
| 4–9 | preferably |
| 5–8 | parts by weight of an atactic polypropylene and in addition |
| 0.8 | part by weight of a processing aid mixture. |

What is claimed is:

1. A process for welding composite plastic films, comprising the steps of:
   (A) providing
      (i) a first composite plastic film that comprises an opaque layer comprising about 50–80 parts by weight of polypropylene, about 5–15 parts by weight of a constituent selected from the group consisting of EPDM and EPM, about 0.5–10 parts by weight of filler, about 1–15 parts by weight of ethylene-vinyl acetate copolymer, about 10–30 parts by weight of polyethylene or ethylene copolymer, about 0–3.5 parts by weight of a processing aid, and about 0–8 parts by weight of at least one dye or pigment, and a transparent sealing layer comprising a propylene-ethylene copolymer or propylene-ethylene blend, and
      (ii) a second composite plastic film that comprises a transparent layer comprising polypropylene and a transparent sealing layer comprising a propylene-ethylene copolymer or propylene-ethylene blend,
   wherein each of said first and second composite plastic films has a Shore D hardness of about 25–68,
   (B) placing said first composite plastic film in contact with said second composite plastic film, such that said sealing layer of said first composite plastic film directly contacts said sealing layer of said second composite plastic film, forming an interface between said sealing layers,
   (C) bringing said first and second composite plastic films into contact, respectively, with a heated tool that comprises a contact surface, contact line or cutting edge, and
   (D) hot-tool welding said first and second plastic films at said interface.

2. The process as claimed in claim 1, wherein step (B) comprises superimposing said first composite plastic film on said second composite plastic film.

3. The process as claimed in claim 1, wherein said opaque layer comprises 0.1–1.5 parts by weight of said processing aid.

4. The process as claimed in claim 1, wherein at least one of said first and second composite plastic films further comprises an intermediate layer adjacent to the sealing layer.

5. The process as claimed in claim 1, wherein said opaque layer comprises 55–70 parts by weight of polypropylene, 5.5–10 parts by weight of EPDM, 1–5 parts by weight of filler, 3–10 parts by weight of ethylene-vinyl acetate copolymer, 15–25 parts by weight of polyethylene, 0.1–1.5 parts by weight of a processing aid and 0.1–5 parts by weight of at least one dye or pigment.

6. The process as claimed in claim 1, wherein said transparent upper layer comprises 0–2.5 parts by weight of a processing aid per 100 parts by weight of propylene homopolymer.

7. The process as claimed in claim 1, wherein said sealing layers comprise about 1–15 parts by weight of polyethylene units or ethylene units per 100 parts by weight of propylene-ethylene copolymer.

8. The process as claimed in claim 1, wherein said first composite plastic film is a two-layer film consisting of an opaque layer having a thickness of about 50–400 μm and a sealing layer having a thickness of about 20–60 μm.

9. The process as claimed in claim 1, wherein said second composite plastic film is a two-layer film consisting of a sealing layer having a thickness of about 20–60 μm and a transparent surface layer having a thickness of about 50–250 μm.

10. The process as claimed in claim 1, wherein step (D) is effected at an average temperature between about 100° and 190° C.

11. The process as claimed in claim 1, wherein step (C) comprises bringing said first composite film into contact with a tool which has an average welding temperature of 100°-150° C., and bringing said second composite film into contact with a tool which has an average welding temperature of 140°-190° C.

* * * * *